US012563042B2

(12) United States Patent
Long et al.

(10) Patent No.: US 12,563,042 B2
(45) Date of Patent: Feb. 24, 2026

(54) PERFORMING SECURITY PROTOCOL TRANSITIONS WHILE EXECUTING AN EXECUTION ENVIRONMENT OF A VIRTUAL CLOUD NETWORK

(71) Applicant: Oracle International Corporation, Redwood Shores, CA (US)

(72) Inventors: Tony Long, Edmonds, WA (US); Karthik Venkatesh, Bothell, WA (US); Philip Ramsey, Bainbridge Island, WA (US); Arsalan Ahmad, Snohomish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 118 days.

(21) Appl. No.: 18/391,617

(22) Filed: Dec. 20, 2023

(65) Prior Publication Data

US 2025/0211592 A1 Jun. 26, 2025

(51) Int. Cl.
H04L 9/40 (2022.01)

(52) U.S. Cl.
CPC .............. H04L 63/10 (2013.01); H04L 63/20 (2013.01)

(58) Field of Classification Search
CPC ................................ H04L 63/10; H04L 63/20
See application file for complete search history.

(56) References Cited

U.S. PATENT DOCUMENTS

| | | | |
|---|---|---|---|
| 9,391,952 B2 | 7/2016 | Umbehocker | |
| 10,440,066 B2 | 10/2019 | Gonzales et al. | |

| | | | |
|---|---|---|---|
| 10,728,333 B2 | 7/2020 | Hegde et al. | |
| 10,776,504 B2 | 9/2020 | Gadepalli et al. | |
| 10,819,515 B1 * | 10/2020 | Griffin | .................. H04L 9/0841 |
| 10,911,574 B2 | 2/2021 | Pessis et al. | |

(Continued)

FOREIGN PATENT DOCUMENTS

| | | |
|---|---|---|
| CN | 110022366 A | 7/2019 |
| CN | 111224999 A | 6/2020 |

OTHER PUBLICATIONS

Raju et al., "Dynamic Protocol Switching Scheme for Data Query in Wireless Sensor Networks", IJCSNS International Journal of Computer Science and Network Security, vol. 11, No. 6, Jun. 2011, pp. 184-189.

(Continued)

*Primary Examiner* — Oleg Korsak
(74) *Attorney, Agent, or Firm* — Invoke

(57) ABSTRACT

A system determines a trigger condition for executing a security protocol transition with respect to an execution environment of a virtual cloud network. In response to determining the trigger condition, the system executes the security protocol transition while executing the execution environment. The security protocol transition includes terminating execution of a first security protocol and initiating execution of a second security protocol. The first security protocol includes utilizing a first authorization process to authorize a set of network entities to access a set of target resources. The second security protocol includes utilizing a second authorization process to authorize the set of network entities to access the set of target resources. The trigger condition indicates that one or more parameters associated with the virtual cloud network meets a set of transition criteria for executing the security protocol transition.

21 Claims, 7 Drawing Sheets

(56) References Cited

U.S. PATENT DOCUMENTS

| | | | | |
|---|---|---|---|---|
| 2016/0286003 A1* | 9/2016 | Pessis | .................... | H04L 67/01 |
| 2016/0373460 A1* | 12/2016 | Itoh | ......................... | H04L 67/02 |
| 2017/0093700 A1* | 3/2017 | Gilley | .................... | H04L 69/08 |
| 2021/0243209 A1* | 8/2021 | Ramani | ................... | H04L 63/20 |
| 2022/0231970 A1* | 7/2022 | Wang | ................... | H04L 9/0643 |
| 2022/0247771 A1* | 8/2022 | Higgins | ............... | H04L 43/065 |
| 2024/0195810 A1* | 6/2024 | Hayes | ................. | H04L 63/166 |

OTHER PUBLICATIONS

Ray et al., "A Multi-Protocol Security Framework to Support Internet of Things", Lecture Notes of the Institute for Computer Sciences, Jun. 2017, pp. 15.

* cited by examiner

PERFORMING SECURITY PROTOCOL TRANSITIONS WHILE EXECUTING AN EXECUTION ENVIRONMENT OF A VIRTUAL CLOUD NETWORK

TECHNICAL FIELD

The present disclosure relates to security protocols for authorizing network entities to access target resources in an execution environment of a computing network. More particularly, the present disclosure relates to performing security protocol transitions while executing the execution environment.

BACKGROUND

Computing network service providers generally select a security protocol for authorizing network entities to access target resources based on the security needs of the particular computing network. This decision is generally made at the time when the computing network is deployed. The service provider tends to utilize the selected security protocol indefinitely, for example, due to switching costs of implementing a different security protocol.

While a security protocol may be suitable for the security needs of the computing network at the time when the security protocol is selected, the advantages or disadvantages of various security protocols may become more or less significant, for example, as conditions within the computing network change. Consequently, under a first set of conditions, a first security protocol may be preferred over others, while under a second set of conditions, a second security protocol may be preferred over the first security protocol.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment, and they mean at least one. In the drawings.

DETAILED DESCRIPTION

Figure 1:
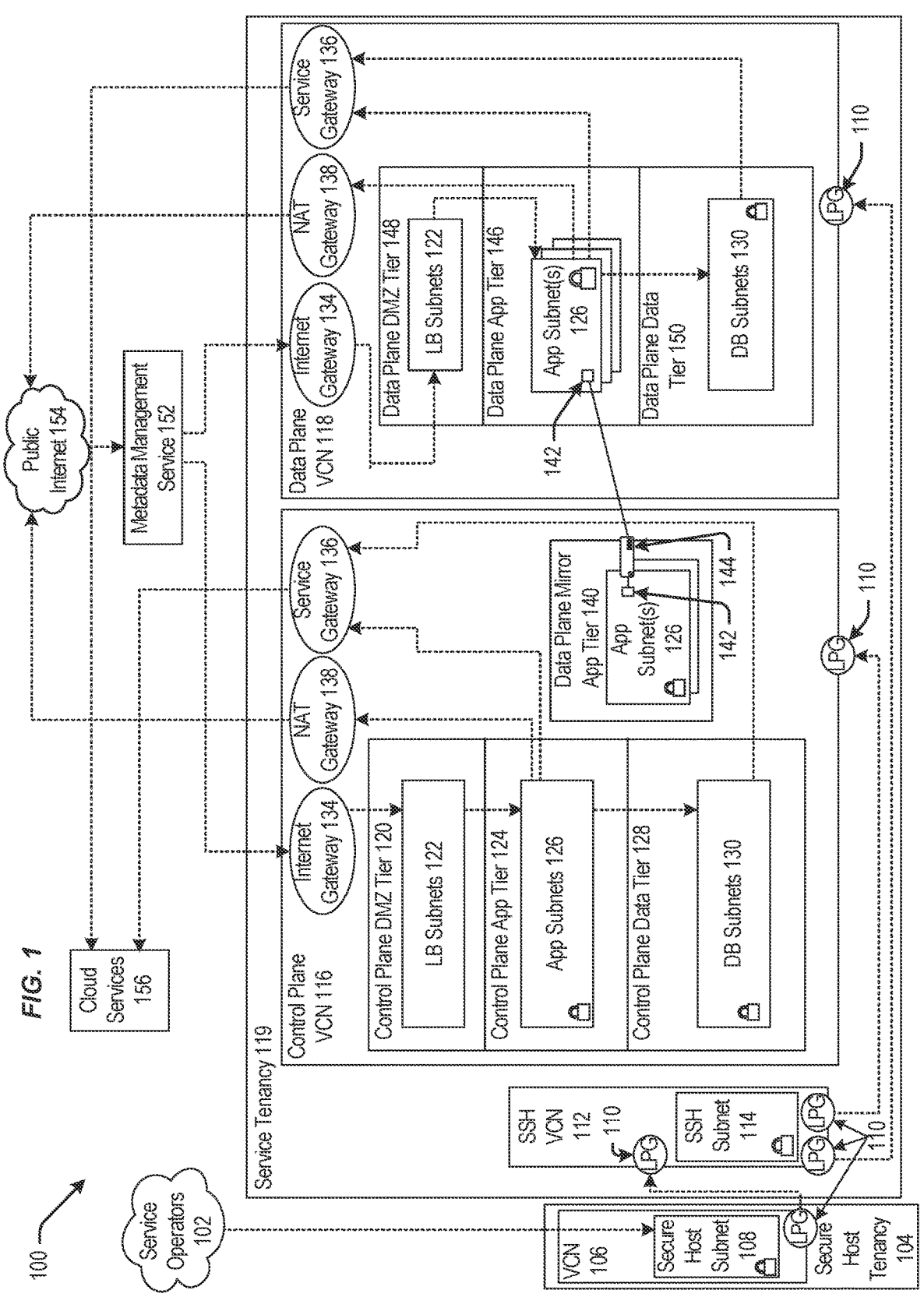
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. General Overview
2. Definitions
3. Cloud Computing Technology
4. Computer System
5. Architectural Overview
6. Example Operations
7. Miscellaneous; Extensions

1. General Overview

While executing an execution environment, a system executes a security protocol transition responsive to detecting a trigger condition. The security protocol transition includes terminating execution of a first security protocol for authorizing network entities to access target resources in the execution environment and initiating execution of a second security protocol for authorizing network entities to access target resources in the execution environment. The system monitors parameters associated with the computing network to determine whether the parameters meet one or more transition criteria for executing the security protocol transition. When the transition criteria are met, the system terminates execution of the first security protocol and initiates execution of the second security protocol. Network entities requesting access to resources on the computing network are authorized in accordance with the particular security protocol that is executing at the time of the request. As parameters associated with the computing network change and different transition criteria are met, the system may revert back to the first security protocol, or the system may terminate execution of the second security protocol and initiate execution of a third security protocol. The security protocol transitions may be executed with respect to an entire computing network or to a particular subset of the computing network, such as to a particular subset of one or more regions, compartments, or resources. The particular security protocol that is initiated may be selected based on a set of attributes corresponding to the current parameters associated with the computing. A state or configuration of the various security protocols may be continuously maintained to facilitate security protocol transitions. The set of available security protocols may include unrelated security protocols or different configurations of a particular security protocol.

In one example, the system may transition to a different security protocol in the event of an outage. The outage may be associated with a particular subsystem that is utilized with a current security protocol prior to transitioning. By transitioning to the different security protocol, resources impacted by the outage may operate in accordance with a different security protocol, and thereby continue to access the computing network during the outage. Additionally, or alternatively, in the event of high network traffic, resources with different security concerns may utilize respectively different security protocols, for example, to avoid or alleviate a bottleneck by distributing network traffic across different subsystems corresponding to the respective security protocols. In one example, resources with lower security concerns may transition to a different security protocol, while resources with higher security concerns may continue utilizing the current security protocol.

In one example, various cloud resources may transition to different security protocols to adapt to changing conditions. Additionally, or alternatively, cloud resources may transition to different security protocols to accommodate changing security requirements, for example, without requiring separate or dedicated cloud resources to accommodate the different security requirements. The security protocols may be specific to particular customers, particular subsystems, particular datasets, or particular workloads. In one example, various cloud resources may transition to different security protocols to avoid or mitigate transient vulnerabilities as and when they arise.

One or more embodiments described in this Specification and/or recited in the claims may not be included in this General Overview section.

2. Definitions

As used herein, the term "execution environment" refers to an infrastructure or platform where various elements of a computing network, such as a virtual cloud network, are deployed and executed. An execution environment may include a set of network entities, a set of target resources, and/or a set of associated services that facilitate the operation of applications, services, or workloads within the computing network. In one example, an execution environment may include a set of compute resources, such as virtual machines, containers, or serverless functions. Additionally, or alternatively, an execution environment may include a set of networking components to enable communication and traffic flow within the VCN and between different resources. The networking components may include subnets, routing tables, gateways, load balancers, or firewalls. Additionally, or alternatively, an execution environment may include storage services that are utilized by the applications or workloads, such as object storage, block storage, or file storage. Additionally, or alternatively, an execution environment may include a set of security mechanisms, such as an identity and access management system, an encryption system, security groups, or access control lists. Additionally, or alternatively, an execution environment may include a set of monitoring and/or management tools.

As used herein, the term "principal" refers to an identity of an entity that interacts with and accesses cloud resources or services. A principal may be utilized by an identity access management system to uniquely identify and/or authenticate the identity of the entity represented by the principal. The principal may be associated with one or more access policies that define what actions associated with the principal are to be allowed or denied by the identity access management system. As examples, the entity associated with a principal may include a user, a device, a resource, or a service. A principal may include a user principal, a resource principal, a service principal, a device principal, a role principal, or a group principal. A user principal may represent an identity of an individual user. A user principal may be associated with a customer, a tenant, a cloud provider, or a cloud operator. A resource principal may represent an identity of a network entity or resource. A service principal may represent an identity of an application or a service. A device principal may represent an identity of a particular computing device. A role principal may represent an identity of a specific role or set of responsibilities within an organization or system. A group principal may represent an identity of a group of users or other principals. A group principal may be used to uniquely identify and/or authenticate the group. A group principal may be used to simplify access control by providing access control policies that are to be applied to a group of users or other principles rather than individual users or other principals.

As used herein, the term "access policy" refers to a set of one or more rules, permissions, or configurations that define what actions are allowed or denied for a particular principal with respect to particular resources within a computing network such as a virtual cloud network. An access policy may be managed by an identity access management system. The identity access management system may include one or more access policies associated with a particular principal. Additionally, or alternatively, the identity access management system may include one or more access policies corresponding to a particular resource. An access policy may be associated with one or more compartments of a virtual cloud network. Additionally, or alternatively, an access policy may be associated with one or more logical containers of a particular compartment.

As used herein, the term "compartment" refers to a set of one or more logical containers utilized to organize and segregate resources, services, and/or permissions of a cloud computing environment.

As used herein, the term "logical container" refers to a virtual structure used to organize and manage cloud resources, services, or data.

As used herein, the term "target resource" refers to a cloud resource that may be accessed based on one or more access policies in an identity access management system. As examples, a target resource may include one or more of: virtual machines, databases, services, data storage resources, containers, compartments, or networking resources.

As used herein, the term "tenant" refers to an entity that receives cloud computing services provided by a cloud provider.

As used herein, the term "cloud provider" or "service provider" refers to a provider of cloud computing services, such as an Infrastructure as a Service and/or one or more target services located on a cloud provider infrastructure.

As used herein, the term "cloud operator" refers to an entity that maintains cloud infrastructure. A cloud operator may perform services on behalf of a cloud provider, such as provisioning, configuring, or managing cloud resources and related infrastructure. A cloud operator and a cloud provider may be different entities or the same entities.

As used herein, the term "customer" may refer to a tenant or an entity that receives services from a tenant.

As used herein, the term "on-premises network" refers to a network infrastructure or device that is located and operated within a physical premises or data center of a tenant.

As used herein, the term "multi-cloud environment" refers to a cloud computing environment used by an organization to integrate services and resources from multiple cloud providers. In a multi-cloud environment, an organization may simultaneously utilize the infrastructure, platform, or software services of two or more cloud providers rather than rely on a single cloud provider. Additionally, or alternatively, in a multi-cloud environment, a first cloud provider may be a customer or a client with respect to a second cloud provider.

As used herein, the term "network entity" refers to a device, component, or element within a computer network and/or cloud infrastructure. A network entity may be implemented in hardware and/or software.

As used herein, the term "digital certificate" refers to a digitally signed electronic document that binds a public key to the identity of an entity or certificate holder. The entity or certificate holder may hold a private key corresponding to the public key. The public key may be included in or associated with the digital certificate. The digital certificate may be validated by matching the public key to the private key using cryptography. A digital certificate may conform to International Telecommunication Union standard X.509. A digital certificate may include an issuer's name, a certificate holder's name, a public key, issuer (CA) information, and an expiration date. Digital certificates may be used in various security protocols, such as a secure socket layer (SSL)/ transport layer security (TLS), to establish the identity and authenticity of the communicating parties and facilitate secure communication.

As used herein, the term "token" refers to a data element that serves as proof of an identity or of an authenticated principal. A token may have an expiry and may generally have a short period when the token may be utilized. In one example, a token may have a time-based expiry such that the token expires after a period of time. Additionally, or alternatively, a token may have a session-based expiry such that the token expires when a session is terminated. In one example, a token may be issued in response to a token request process. The token request process may include sending a token request to an authorization server that includes an authentication credential, such as a digital certificate, an authorization code, or another token. In one example, a token may conform to an OAuth 2.0 protocol.

3. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling Operating System (OS), middleware, and/or application deployment e.g., on self-service virtual machines that can be spun up on demand.

In some examples, IaaS provisioning may refer to acquiring computers or virtual hosts for use and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on one another, and how they work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices that may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124. The LB subnet(s) 122 may further be communicatively coupled to an Internet gateway 134 that can be contained in the control plane VCN 116. The app subnet(s) 126 can be communicatively coupled to the DB subnet(s) 130 contained in the control plane data tier 128, a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The service gateway 136 can make API calls to cloud services 156, and cloud services 156 can send requested data to the service gateway 136.

In some examples, the secure host tenancy 104 can be directly connected to the service tenancy 119 that may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118. The data plane mirror app tier 140 of the control plane VCN 116 can communicate with the data plane app tier 146 of the data plane VCN 118 via VNICs 142. VNICs 142 can be contained in the data plane mirror app tier 140 and the data plane app tier 146.

In some examples, users of the system, or customers, can make requests, for example create, read, update, delete, or list (CRUDL) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configurations of resources contained in the data plane VCN 118.

In some embodiments, the control plane VCN 116 and the data plane VCN 118 can be contained in the service tenancy 119. The user, or the customer, of the system may be restricted from owning or operating either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users' or other customers' resources. Also, this embodiment may allow users or customers of the system to store databases privately without needing to rely on public Internet 154 that may not have a desired level of threat prevention for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119 that may be isolated from public Internet 154.

Figure 2:
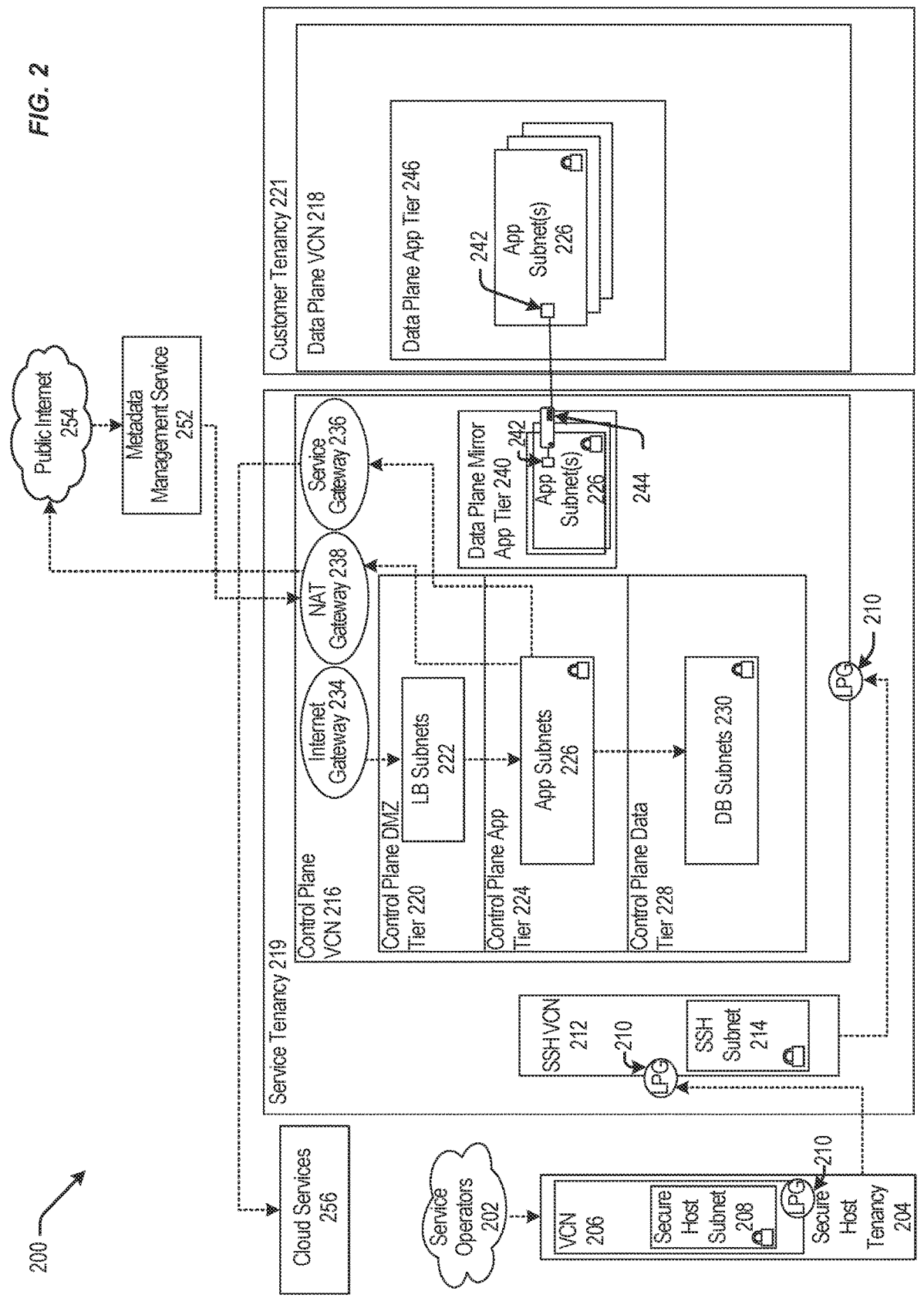

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1). The Internet gateway 234 can be contained in the control plane VCN 216. Additionally, the app subnet(s) 226 can be communicatively coupled to the DB subnet(s) 230 contained in the control plane data tier 228, a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218, contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in Region 1, and cloud service Deployment 1 may be located in Region 1 and in Region 2. If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
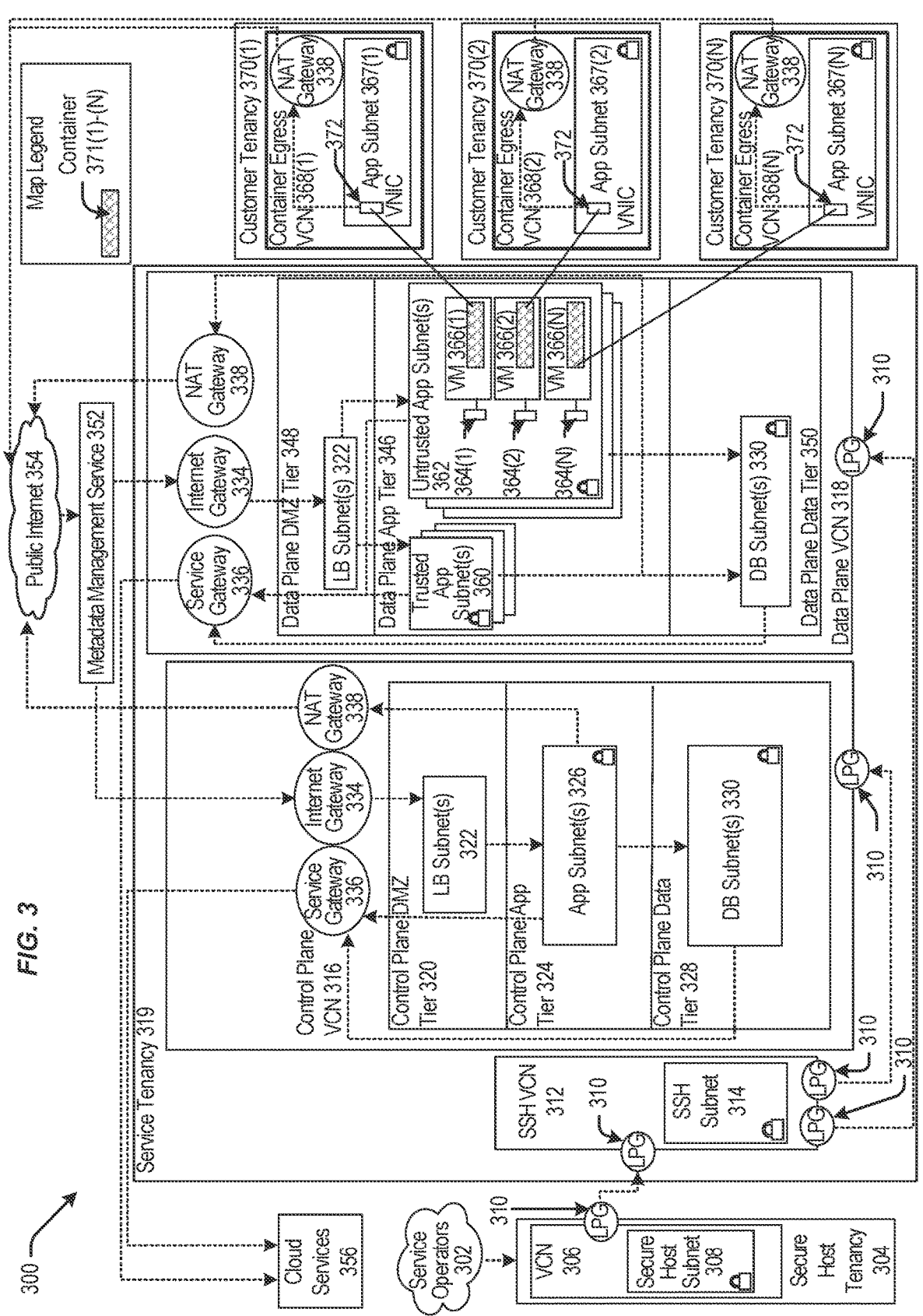

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316. Additionally, the app subnet(s) 326 can be communicatively coupled to the DB subnet(s) 330 contained in the control plane data tier 328, to a service gateway 336 (e.g., the service gateway of FIG. 1), and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code, where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
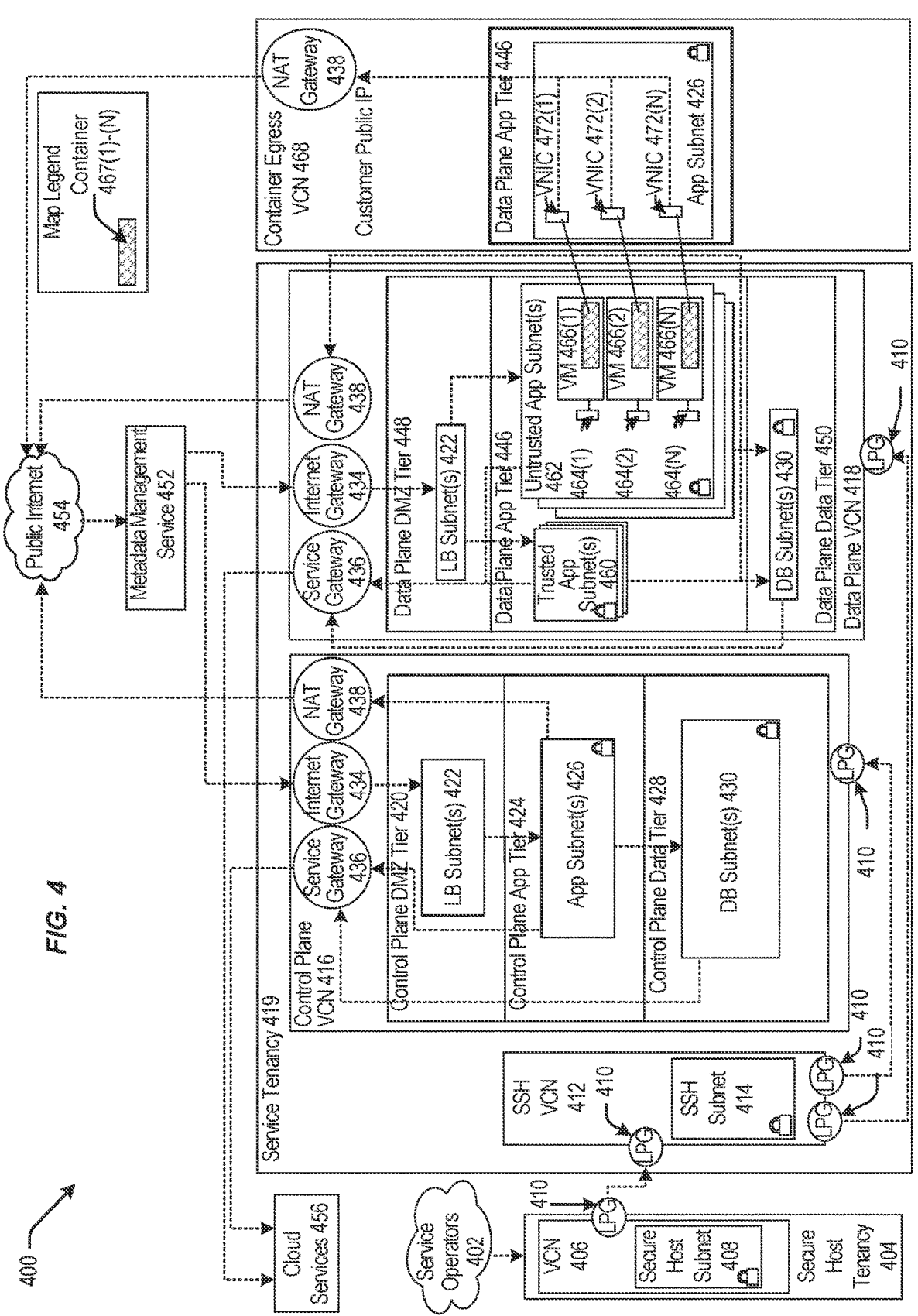

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1). The SSH VCN 412 can be communicatively coupled to a control plane VCN 416 (e.g., the control plane VCN 116 of FIG. 1) via an LPG 410 contained in the control plane VCN 416. The SSH VCN 412 can be communicatively coupled to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424.

The LB subnet(s) 422 can be communicatively coupled to an Internet gateway 434 (e.g., the Internet gateway 134 of FIG. 1) that can be contained in the control plane VCN 416. The app subnet(s) 426 can be communicatively coupled to the DB subnet(s) 430 contained in the control plane data tier 428, a service gateway 436 (e.g., the service gateway of FIG. 1), and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3. The pattern illustrated by the architecture of block diagram 400 of FIG. 4 may be implemented for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467 (1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use the same network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource when the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset stored by the computer network is tagged with a tenant ID. A tenant is permitted access to a particular application, data structure, and/or dataset when the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, the database may be shared by multiple tenants.

In an embodiment, a subscription list indicates the tenants that have authorization to access an application. For each application, a list of tenant IDs of tenants authorized to access the application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

4. Computer System

Figure 5:
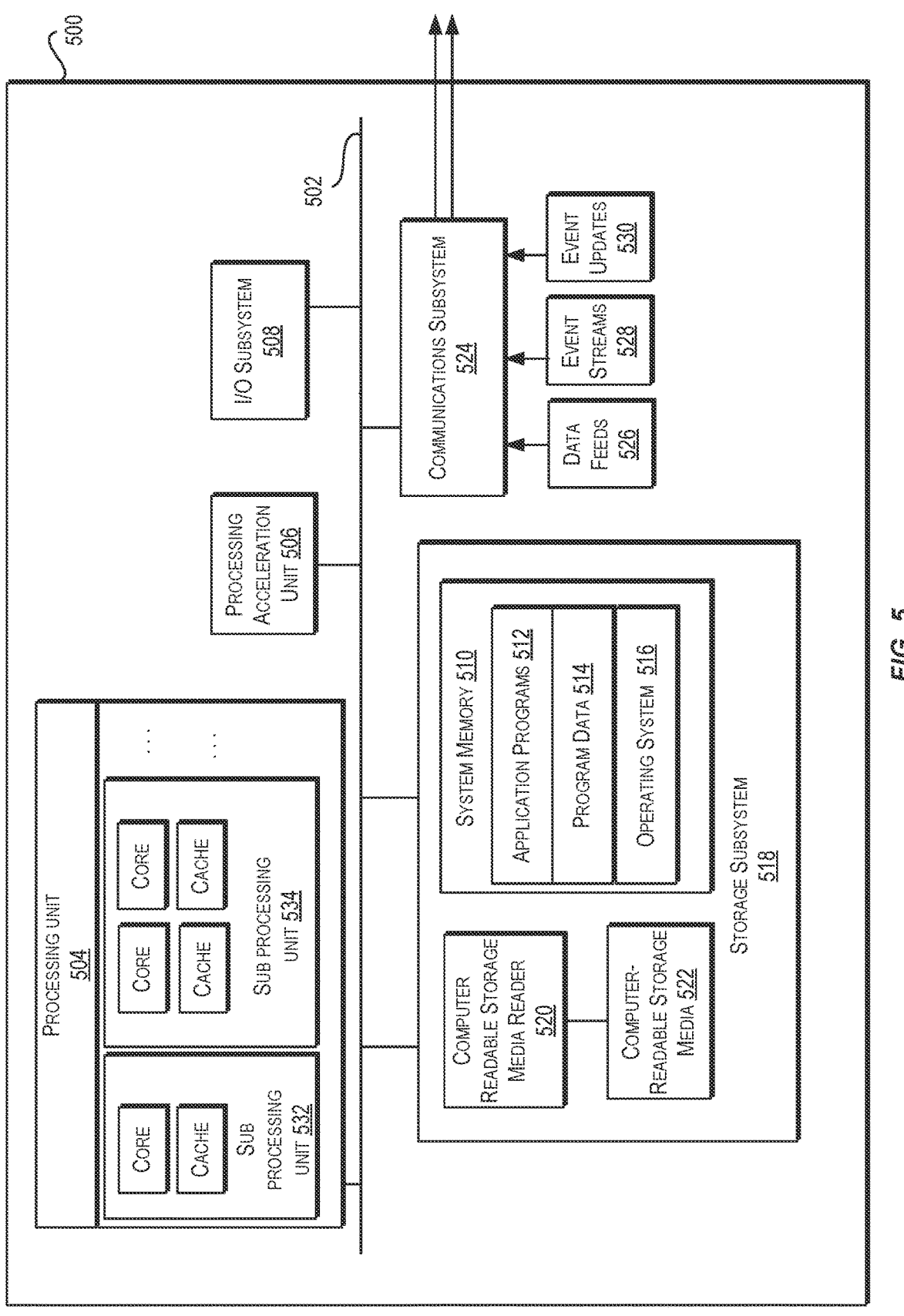
FIG. 5 is a hardware system in accordance with one or more embodiments.

FIG. 5 illustrates an example computer system 500, where various embodiments may be implemented. The system 500 may be used to implement any of the computer systems described above. As shown in FIG. 5, computer system 500 includes a processing unit 504 that communicates with several peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. The PCI bus can be implemented as a Mezzanine bus manufactured to the IEEE P1386.1 standard.

Processing unit 504 that can be implemented as one or more integrated circuits (e.g., a conventional microprocessor or microcontroller) controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some of the program code to be executed can be resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator) through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 500 may comprise a storage subsystem 518 that provides a tangible, non-transitory, computer-readable storage medium for storing software and data constructs that provide the functionality of the embodiments described in this disclosure. The software can include programs, code modules, instructions, scripts, etc., that when executed by one or more cores or processors of processing unit 504, provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations, where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams that may include event streams 528 of real-time events and/or event updates 530 that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

5. Architectural Overview

Figure 6:
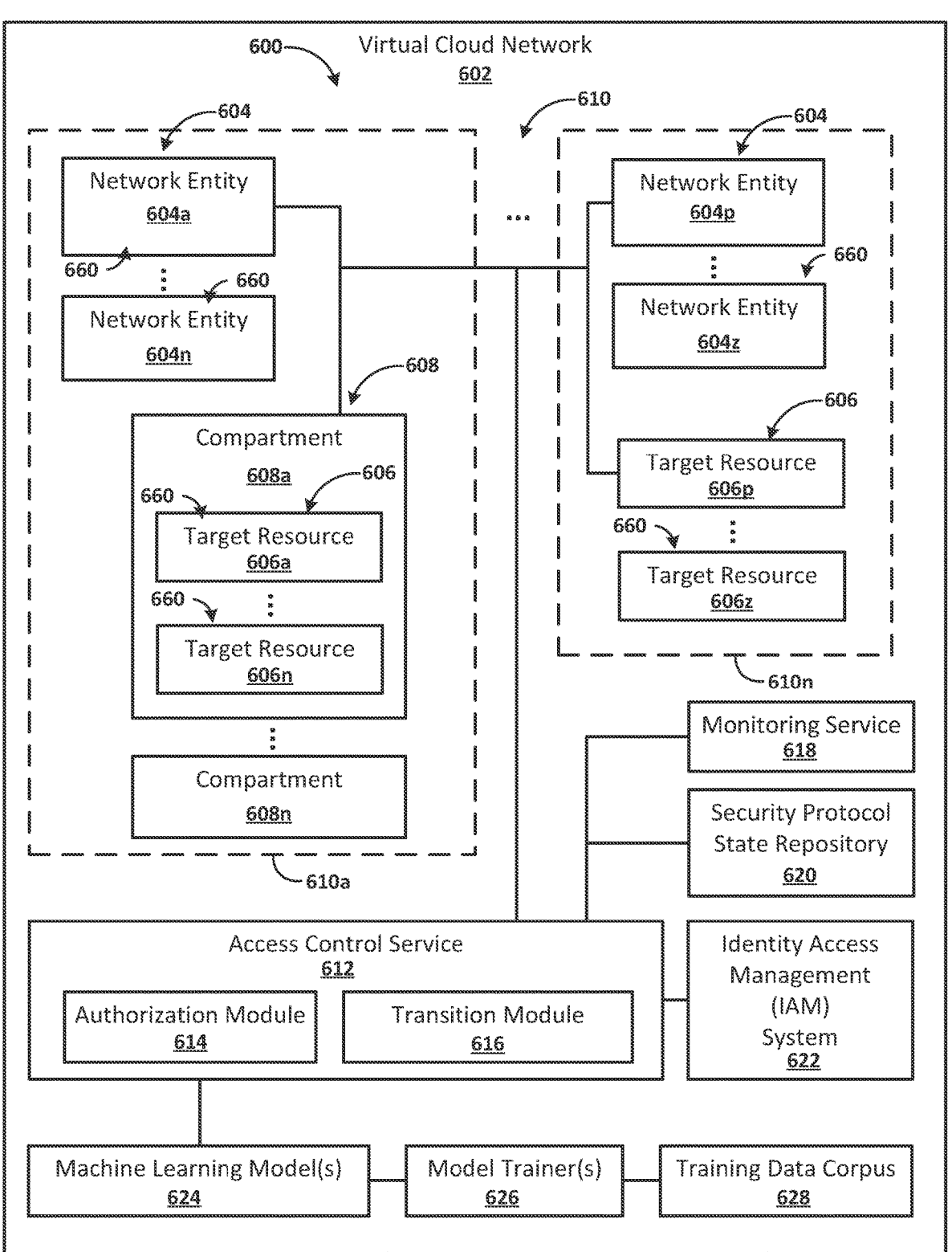
FIG. 6 illustrates features of an example system in accordance with one or more embodiments.

FIG. 6 illustrates one example of a system 600 in accordance with one or more embodiments. The system 600 described with reference to FIG. 6 may perform operations associated with executing authorization processes for determining actions that a network entity is authorized to perform. Additionally, the system 600 described with reference to FIG. 6 may perform operations associated with re-executing authorization processes.

A. Example Computing Network

As shown in FIG. 6, the system 600 may include a computing network, such as a virtual cloud network 602. The virtual cloud network 602 may include one or more network entities 604 (such as network entity 604a, network entity 604n, network entity 604p, and network entity 604z). Additionally, the virtual cloud network 602 may include one or more target resources 606 (such as target resource 606a, target resource 606n, target resource 606p, and target resource 606z). In one example, the target resources 606 may include network entities 604. In one example, a first network entity 604 may access a second network entity 604, and the second network entity 604 may be a target resource 606 with respect to the first network entity 604. Additionally, or alternatively, the second network entity 604 may access the first network entity 604, and the first network entity 604 may be a target resource 606 with respect to the second network entity 604.

The target resources 606 may be respectively located in one or more compartments 608, such as compartment 608a or compartment 608n. For example, as shown, target resource 606a and target resource 606n are located in compartment 608a. Additionally, or alternatively, one or more target resources 606 may be located outside of a compartment 608, such as in a different portion of the virtual cloud network 602. In one example, a compartment 608 may be associated with a particular tenant. Additionally, or alternatively, a compartment 608 may be associated with cloud provider. A compartment 608 that is associated with a cloud provider may encompass one or more compartments 608 respectively associated with a particular tenant. Additionally, or alternatively, a compartment 608 associated with a cloud provider and one or more compartments 608 associated with various tenants may respectively represent separate portions of the virtual cloud network 602.

In one example, one or more network entities 604 may be located external to the virtual cloud network 602. In one example, the virtual cloud network 602 may represent a portion of a multi-could network. For example, a first virtual cloud network (e.g., virtual cloud network 602) may be associated with a first cloud provider, and a second virtual cloud network (not shown) may be associated with a second cloud provider. The first virtual cloud network (e.g., virtual cloud network 602) may include one or more target resources 606, and the second virtual cloud network (not shown) may include one or more network entities 604 that may access the one or more target resources 606. Additionally, or alternatively, the one or more network entities 604 may be located on an on-premises network.

The virtual cloud network may include one or more execution environments 610 (such as execution environment 610a and environments 610n). An execution environment may include one or more network entities 604 and one or more target resources 606. For example, as shown in FIG. 6, execution environment 610a may include network entity 604a and network entity 604n as well as target resource 606a and target resource 606n. Additionally, or alternatively, execution environment 610n may include network entity 604p and network entity 604z as well as target resource 606p and target resource 606z.

B. Example Access Control Services and Related Services

Referring further to FIG. 6, the virtual cloud network 602 may include an access control service 612. The network entities 604 may access the target resources 606 via the access control service 612. The access control service 612 may execute one or more security protocols for authorizing a set of network entities 604 to access a set of target resources 606. In one example, the access control service 612 may include an authorization module 614 configured to execute operations associated with authorizing network entities 604 to access target resources 606 in accordance with a respective security protocol. The various security protocols may be executed with respect to one or more execution environments and/or with respect to one or more execution environments 610 or a subset of an execution environment, such as with respect to one or more compartments 608 or one or more target resources 606. The access control service 612 may include a transition module 616. The transition module 616 may execute security protocol transitions to transition from a first security protocol to a second security protocol. The security protocol transitions may be executed for one or more execution environments while the respective one or more execution environments are executing. The security protocol transitions may respectively include terminating execution of the first security protocol and initiating execution of the second security protocol.

In one example, an access control service 612 may execute operations pertaining to a plurality of execution environments 610. For example, as shown in FIG. 6, the access control service 612 may execute operations pertaining to execution environment 610a and execution environment 610n. Additionally, or alternatively, the virtual cloud network 602 may include a plurality of access control services 612, and each access control service 612 may respectively execute operations pertaining to a particular subset of execution environments 610.

In one example, the virtual cloud network 602 may include a monitoring service 618. The monitoring service 618 may execute operations associated with monitoring a set of one or more parameters associated with the virtual cloud network 602. The transition module 616 may determine trigger conditions for executing security protocol transitions based on the set of one or more parameters monitored by the monitoring service 618. A trigger condition determined by the transition module 616 may indicate that the set of one or more parameters meets a set of one or more transition criteria for executing a security protocol transition. The set of one or more transition criteria may include a change in at least one parameter of the set of one or more parameters monitored by the monitoring service 618.

In one example, the virtual cloud network 602 may include a security protocol state repository 620. The security protocol state repository 620 may include a set of security protocol snapshots that respectively represent a state or a configuration of an execution environment corresponding to a particular security protocol. The transition module 616 may execute security protocol transitions based on security protocol snapshots in the security protocol state repository 620. In one example, when executing a security protocol transition, the transition module 616 may identify a security protocol snapshot in the security protocol state repository 620 that corresponds to the particular security protocol, and the execution environment 610 may transition to the particular security protocol identified in the security protocol snapshot. Upon having identified the security protocol snapshot, the transition module 616 may execute one or more operations for configuring the execution environment 610 in accordance with the security protocol snapshot.

In one example, the virtual cloud network 602 may include an identity access management (IAM) system 622. One or more security protocols may utilize the IAM system 622. The IAM system 622 may manage and store access policies associated with various principals that represent an identity of an entity that interacts with and accesses cloud resources or services. The IAM system 622 may include, for a set of one or more principals, one or more access policies associated with the identity of a particular principal. The access policies may respectively define permissions or actions that are authorized or denied, for example, with respect to a respective principal. The access policies may be associated with a set of one or more target resources 606. Additionally, or alternatively, the access policies may be associated with one or more compartments of the virtual cloud network 602, such as a compartment where a particular set of target resource 606 is located.

C. Example Machine-Learning Models.

Referring further to FIG. 6, in one example, the virtual cloud network 602 may include one or more machine learning models 624. A machine learning model 624 may be utilized to determine an occurrence of a trigger condition for a security protocol transition. Additionally, or alternatively, a machine learning model 624 may be utilized to determine a set of one or more transition criteria corresponding to a trigger condition for triggering a security protocol transition. Additionally, or alternatively, a machine learning model 624 may be utilized to select a particular security protocol for a security protocol transition.

A machine learning model 624 may include one or more machine-learning algorithms configured to select a particular security protocol for a security protocol transition and/or to determine an occurrence of a trigger condition or one or more transition criteria corresponding to the trigger condition. The machine learning model 624 may automatically learn relevant patterns and relationships based on a dataset that includes a plurality of security protocol data elements, for example, without the need for manual selection of parameters or strong assumptions about the dataset. The one or more machine learning algorithms can be iterated to learn a target model f that best maps a set of input variables to an output variable. A machine learning algorithm may be configured to generate and/or train a machine learning model 624. A machine learning algorithm may be iterated to learn a target model f that best maps a set of input variables to an output variable using a set of training data.

A machine learning algorithm may generate a target model f such that the target model f best fits the datasets of training data to the labels of the training data. Additionally, or alternatively, a machine learning algorithm may generate a target model f such that when the target model f is applied to the datasets of the training data, a maximum number of results determined by the target model f matches the labels of the training data. Different target models may be generated based on different machine learning algorithms and/or different sets of training data. A machine learning algorithm may include supervised algorithms and/or unsupervised algorithms. Various types of algorithms may be used, such as linear regression, logistic regression, linear discriminant analysis, classification and regression trees, naïve Bayes, k-nearest neighbors, learning vector quantization, support vector machine, bagging, and random forest, boosting, back-propagation, and/or clustering.

In one example, the virtual cloud network 602 may include a model trainer 626 that includes one or more machine learning algorithms configured to generate and/or train a machine learning model 624. The model trainer 626 may obtain and/or generate feedback from one or more of the machine learning models 624. The feedback may correspond to one or more outputs of a machine learning model 624. The model trainer 626 may train, update, and/or retrain one or more of the machine learning models 624 based at least in part on the feedback. The feedback may correspond to one or more outputs of at least one machine learning model 624.

In one example, the model trainer 626 may obtain a plurality of training datasets such as from a training data corpus 628. The model trainer 626 may train a machine learning model 624 based at least in part on the plurality of training datasets. In one example, the training data may include outputs from one or more of the machine learning models 624. For example, a machine learning model 624 may be iteratively trained and/or re-trained based at least in part on outputs generated by one or more of the machine learning models 624. A machine learning model 624 may be iteratively improved over time as additional datasets are analyzed by the machine learning model 624 to produce additional outputs, and the machine learning model 624 is iteratively trained or re-trained based on the additional outputs.

In one example, the training data may include one or more initial supervised learning datasets. The model trainer 626 may train a machine learning model 624 based at least in part on the one or more initial supervised learning datasets. In one example, the training data may include one or more subsequent supervised learning datasets. The model trainer 626 may update or retrain the machine learning model 624 based on one or more subsequent supervised learning datasets. The one or more subsequent supervised learning datasets may be generated based at least in part on feedback corresponding to one or more outputs of the machine learning model 624. In one example, the feedback may include data associated with one or more security protocol transitions. Additionally, or alternatively, the feedback may correspond to one or more parameters associated with the virtual cloud network 602. The one or more parameters associated with the virtual cloud network 602 may correspond to particular security protocol transitions.

Training data used by a machine learning algorithm may be stored in the training data corpus 628. The training data may include datasets and associated labels. The datasets may be associated with input variables for the target model f. The associated labels may be associated with the output variable of the target model f. The training data may be updated based on, for example, feedback on the accuracy of the current target model f. Updated training data may be fed back into the machine learning algorithms that in turn update the target model f.

Additionally, or alternatively, to a machine learning model 624, the access control service 612 may utilize one or more classical models configured to select a particular security protocol for a security protocol transition and/or to determine an occurrence of a trigger condition or one or more transition criteria corresponding to the trigger condition. A classical model may include one or more classical statistical algorithms that rely on a set of assumptions about one or more of the underlying data, the data generating process, or the relationships between the variables. Example classical statistical algorithms may include linear regression, logistic regression, ANOVA (analysis of variance), or hypothesis testing.

D. Example Network Entities

Referring further to FIG. 6, the system 600 may include a plurality of network entities 660. The plurality of network entities 660 may include a plurality of network entities 604 and/or a plurality of target resources 606. The network entities 660 may be located throughout one or more virtual cloud networks 602. A network entity 660 may reside on a substrate network, an overlay network, or a network interface. A network entity 660 may be implemented in hardware and/or software. A network entity may include a node, a host, an agent, a service, a component, an endpoint, or other element. The plurality of network entities 660 may include one or more substrate entities, one or more interface entities, and/or one or more overlay entities.

As used herein, the term "substrate entity" refers to a network entity 660 implemented in a substrate network. As used herein, the term "substrate network" refers to a physical network infrastructure. The substrate network generally provides a foundation of a virtual cloud network. The substrate network may include physical network devices, such as routers, switches, network links, and other networking components. The substrate network may generally provide the basic connectivity and transport capabilities necessary for data transmission within and between data centers.

The one or more substrate entities may include substrate hosts, routers, firewall appliances, load balancers, storage devices, and/or substrate services. A substrate host may include an endpoint within the substrate network, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity may include a combination of hardware and software. In one example, the one or more substrate entities may include one or more substrate hosts and/or one or more substrate services. In one example, a substrate host may include a bare metal host. In one example, a substrate service may include a firmware service. The substrate entities may communicate with one another, and/or with other network entities 660, using logical network addresses assigned within the overlay network.

As used herein, the term "network interface" refers to a communication interface between a substrate network and an overlay network, such as a network interface card, a smartNIC, or the like. A network interface may include one or more interface entities, such as a node on the network interface or an interface service executing or executable on the network interface. A node on the network interface may include a programmable hardware component, a memory component, or a gateway component. In one example, a network interface may include a network interface card, such as a smartNIC. Additionally, or alternatively, a network interface may include a node or an endpoint on a network interface card or smartNIC.

A gateway component may provide connectivity between the substrate network and the network interface, and/or between the network interface and the overlay network. For example, a gateway component may enable communication between overlay entities and substrate entities. Additionally, or alternatively, a gateway component may provide connectivity between the overlay network and external networks, such as the internet or other networks outside the overlay network. For example, an overlay gateway may enable communication between overlay entities and external endpoints.

As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity implemented on an overlay network. The overlay network may include a plurality of overlay entities. The plurality of overlay entities may include overlay hosts, overlay services, subnets, overlay controllers, and/or overlay clients. In one example, the overlay network may include a plurality of overlay entities. In one example, an overlay entity may include an overlay host. Additionally, or alternatively, an overlay entity may include an overlay service. The plurality of overlay entities may communicate with one another using logical network addresses assigned within the overlay network.

An overlay host may include an endpoint within the overlay network, such as a virtual machine, a container, or a physical server. An overlay service may include a service executing or executable on an overlay entity. An overlay service may include a client-specific service, such as a service installed by a client. Additionally, or alternatively, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interacts with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

The plurality of network entities 660 may include a plurality of data repositories. Each of the data repositories may include any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. The data repositories may share one or more storage units with one another. Additionally, or alternatively, the data repositories may include one or more storage units that differ from one another. Further, one or more of the data repositories may be implemented or executed on the same computing system as virtual cloud network 602. Additionally, or alternatively, one or more of the data repositories may be implemented or executed on a computing system separate from virtual cloud network 602.

In one or more embodiments, the system 600 may include more or fewer components than the components illustrated in FIG. 6. The components illustrated in FIG. 6 may be local to or remote from each other. The components illustrated in FIG. 6 may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. Example Operations

Figure 7:
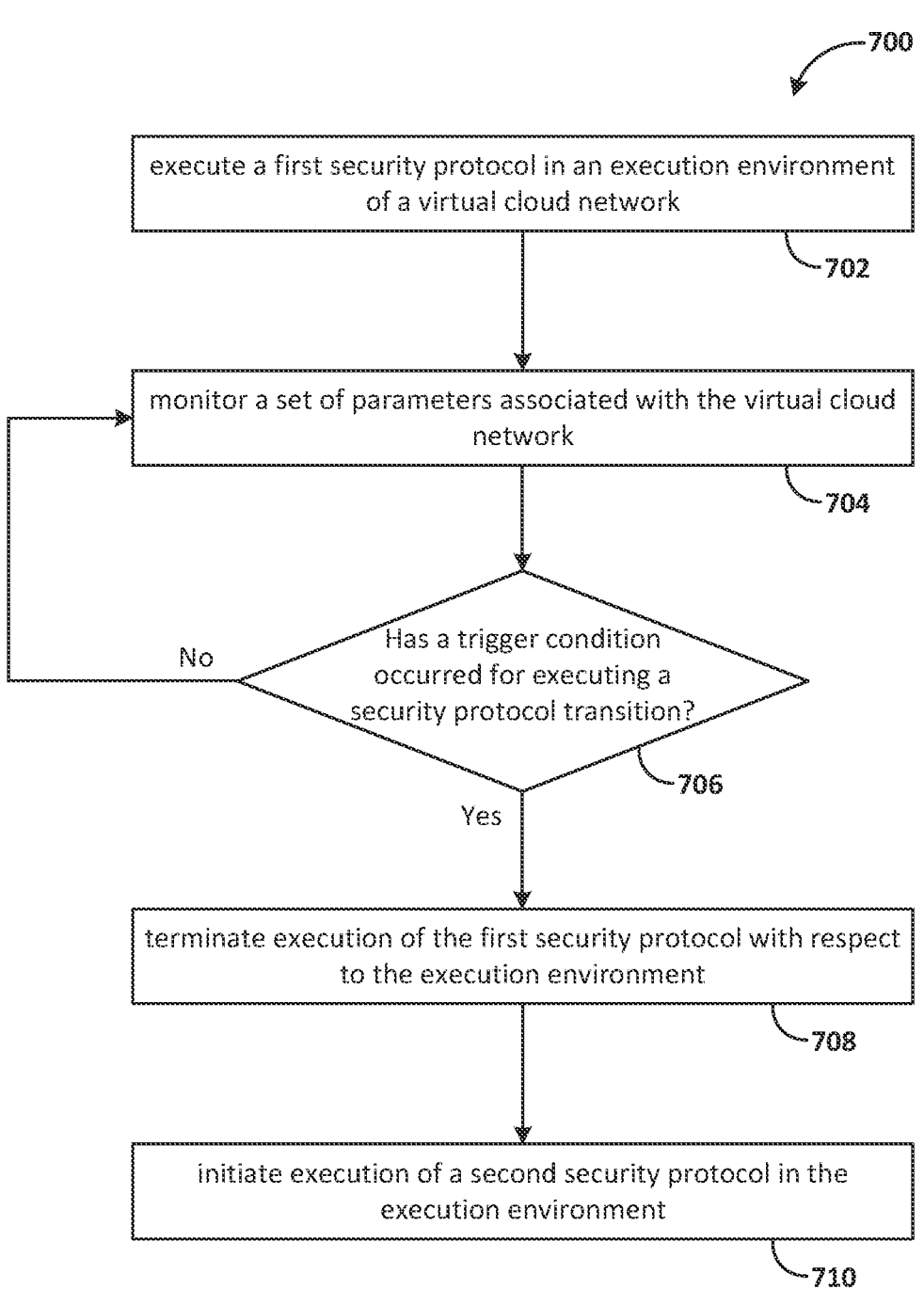
FIG. 7 is a flowchart that illustrates example operations related to performing security protocol transitions while executing an execution environment of a computing network.

Referring now to FIG. 7, operations 700 pertaining to performing security protocol transitions while executing an execution environment of a computing network are further described. One or more operations 700 described with reference to FIG. 7 may be modified, combined, rearranged, or omitted Accordingly, the particular sequence of operations 700 described with reference to FIG. 7 should not be construed as limiting the scope of one or more embodiments. In one example, the operations 700 may be performed by the one or more components of the system described with reference to FIG. 6.

As shown in FIG. 7, the operations 700 may include, at block 702, executing a first security protocol in an execution environment of a virtual cloud network. The first security protocol may include utilizing a first authorization process to authorize a set of network entities to access a set of target resources corresponding to the first execution environment. Executing the first security protocol may include executing the first authorization process with respect to at least one network entity of the set of network entities.

At block 704, the operations 700 may include monitoring a set of parameters associated with the virtual cloud network. The parameters associated with the virtual cloud network may be monitored by a monitoring service. The monitoring service may monitor the parameters associated with the virtual cloud network using at least one of: agent-based monitoring, API integration monitoring tools, SNMP (Simple Network Management Protocol), packet inspection, log analysis, event monitoring, synthetic monitoring, or machine learning.

At block 706, the operations 700 may include determining whether a trigger condition has occurred for executing a security protocol transition. When the trigger condition has not occurred, the operations 700 may return to block 704. When the trigger condition has occurred, the operations 700 may include executing the security protocol transition while executing the first execution environment. The trigger condition may indicate that the set of parameters meets a set of one or more transition criteria for executing the security protocol transition. The set of one or more transition criteria may include a change in at least one parameter of the set of one or more parameters associated with the virtual cloud network.

To execute the security protocol transition, the operations 700 may proceed to block 708. At block 708, executing the security protocol transition may include terminating execution of the first security protocol with respect to the execution environment. Additionally, at block 710, executing the security protocol transition may include initiating execution of a second security protocol in the execution environment. The second security protocol may include utilizing a second authorization process to authorize the set of network entities to access the set of target resources. Execution of the second security protocol may include executing the second authorization process with respect to at least one network entity of the set of network entities.

A. Example Security Protocol Transitions

In one example, the operations 700 may further include executing one or more security transitions while executing the execution environment. The one or more additional security protocol transitions may include transitioning from the second security protocol back to the first security protocol. Additionally, or alternatively, the one or more additional security protocol transitions may include transitioning from the second security protocol to a third security protocol.

In one example, subsequent to initiating execution of the second security protocol, the operations 700 may include determining that the set of one or more transition criteria is unmet. Responsive to determining that the set of one or more transition criteria is unmet, the operations 700 may include executing a second security protocol transition. Additionally, or alternatively, the operations 700 may include determining that a second set of one or more transition criteria is met. Additionally, responsive to determining that the second set of one or more transition criteria is met, the operations may include executing the second security protocol transition responsive to determining that the second set of one or more transition criteria is met. The second set of one or more transition criteria corresponding to the second security protocol transition may differ from the set of one or more transition criteria corresponding to the first security protocol transition.

The second security protocol transition may include terminating execution of the second security protocol with respect to the execution environment and re-initiating execution of the first security protocol in the execution environment. The system may resume executing the first security protocol in the execution environment after terminating execution of the second security protocol and re-initiating execution of the first security protocol. Execution of the first security protocol may include executing the first authorization process with respect to at least one network entity of the set of network entities. Additionally, or alternatively, the second security protocol transition may include terminating execution of the second security protocol with respect to the execution environment. Additionally, the second security protocol transition may include initiating execution of the third security protocol in the execution environment. The third security protocol may include utilizing a third authorization process to authorize the set of network entities to access the set of target resources. Execution of the third security protocol may include executing the third authorization process with respect to at least one network entity of the set of network entities.

In one example, a first trigger condition may be utilized for a first security protocol transition, and a second trigger condition may be utilized for a second security protocol transition. The first trigger condition may indicate that a first set of one or more parameters meets a first set of one or more transition criteria for initiating the first security protocol transition. The second trigger condition may indicate that a second set of one or more parameters meets a second set of one or more transition criteria for initiating the second security protocol transition. The second set of one or more transition criteria may differ from the first set of one or more transition criteria. Additionally, or alternatively, the second trigger condition may include a determination that the first set of one or more transition criteria is unmet. The first set of one or more transition criteria may include a first change in at least a first parameter of the set of one or more parameters associated with the virtual cloud network. The second set of one or more transition criteria may include a second change in at least a second parameter of the set of one or more parameters associated with the virtual cloud network. The first security protocol transition may include transitioning from the first security protocol to the second security protocol. The second security protocol transition may include transitioning from the second security protocol back to the first security protocol. Additionally, or alternatively, the second security protocol transition may include transitioning from the second security protocol to a third security protocol.

In one example, different security protocols may be executed in different execution environments of a virtual cloud network. Additionally, or alternatively, when executing a security protocol transition in a first execution environment of the virtual cloud network that includes transitioning from a first security protocol to a second security protocol, the first security protocol may continue being executed in a second execution environment of the virtual cloud network. In one example, a first security protocol may be executed in a first execution environment and a second execution environment. In response to determining a trigger condition for executing a security protocol transition, the system may execute the security protocol transition with respect to the first execution environment while further executing the first security protocol in the second execution environment.

In one example, to facilitate security protocol transitions, the system may maintain a state or a configuration corresponding to one or more security protocols that are not currently being executed in an execution environment. In one example, the state or condition of a particular security protocol may be maintained in a security protocol snapshot that represents the state or the configuration of the execution environment corresponding to the particular security protocol. When transitioning to the particular security protocol, the execution of the particular security protocol may be performed at least in part based on the security protocol snapshot. A set of security protocol snapshots may be maintained in a security protocol state repository. For each particular security protocol, the security protocol state repository may include a security protocol snapshot that represents the state or the configuration of the execution environment corresponding to the particular security protocol. When executing a security protocol transition, the system may identify a security protocol snapshot in the security protocol state repository that corresponds to the particular security protocol, and the system may transition the execution environment to the particular security protocol identified in the security protocol snapshot. Upon having identified the security protocol snapshot, the system may execute one or more operations for configuring the execution environment in accordance with the security protocol snapshot.

In one example, configuring the execution environment in accordance with the security protocol snapshot may include reconstructing a state of the execution environment according to the security protocol snapshot. Additionally, or alternatively, configuring the execution environment may include copying the data and configurations stored in the security protocol snapshot and applying them to relevant components or systems. In one example, configuring the execution environment may include replacing or updating files, databases, or other stored information based at least in part on the security protocol snapshot. Additionally, or alternatively, configuring the execution environment may include defining or modifying system settings, configurations, or parameters based at least in part on the security protocol snapshot.

Additionally, or alternatively, configuring the execution environment may include allocating resources to be utilized in connection with the particular security protocol so that those resources may be available when the system transitions to the particular security protocol. In one example, allocating resources may include provisioning computing resources, storage space, and/or network connectivity components in accordance with the particular security protocol. Additionally, or alternatively, configuring the execution environment may include performing verification checks to verify that the particular security protocol matches the security protocol snapshot, that the particular the security protocol is functioning properly, and/or that the particular the security protocol is operating without generating inconsistencies or errors.

In one example, the state or condition of a particular security protocol may be maintained by placing a set of resources in the execution environment corresponding to the particular security protocol into an idle state or a hibernation mode. One or more of the resources corresponding to the particular security protocol may be specifically allocated to the particular security protocol. Additionally, or alternatively, one or more of the resources corresponding to the particular security protocol may be shared among a plurality of security protocols. The idle state or a hibernation mode may allow components associated with a security protocol that is not currently executing in the execution environment to be maintained in an available state while economizing resource consumption. The system may manage and oversee the states of various security protocols, for example, to ensure that the various states remain available and intact while not in active use. In one example, the system may execute periodic checks or updates to maintain the states of various security protocols.

B. Example Transition Criteria

In one example, the set of one or more transition criteria may include several network entities that are utilizing the particular security protocol meeting a threshold number. In one example, the set of one or more transition criteria may include the number of network entities increasing to an upper threshold number. Additionally, or alternatively, the set of one or more transition criteria may include the number of network entities decreasing to a lower threshold number. In one example, in response to the number of network entities increasing to an upper threshold number, the system may transition to a more efficient security protocol. The transition to the more efficient security protocol may include, or may be limited to, a set of network entities that have a relatively lower security rating. Additionally, or alternatively, a set of network entities that have a relatively higher security rating may be excluded from the transition to the more efficient security protocol. In one example, in response to the number of network entities decreasing to a lower threshold number, the system may transition to a more robust security protocol. The transition to the more robust security protocol may include, or may be limited to, a set of network entities that have a relatively lower security rating. Additionally, or alternatively, a set of network entities that have a relatively higher security rating may already be utilizing the more robust security protocol.

In one example, the set of one or more transition criteria may include an occurrence of an outage associated with the execution environment. The outage may impact one or more systems or components associated with the security protocol executing in the execution environment. The security protocol transition may include a transition to an alternate security protocol that is unaffected by the outage. By transitioning to the alternate security protocol in the event of the outage, the execution environment may remain operational, and/or the alternate security protocol may be utilized to provide appropriate security measures for the execution environment. In one example, the system may transition from the alternate security protocol back to the previous security protocol upon the conclusion of the outage.

In one example, the set of one or more transition criteria may include a security requirement. The security requirement may include at least one of: customer security requirement, a data security requirement, or a workload security requirement. A customer security requirement may be applicable to access of at least one customer to the execution environment. In one example, a customer may have particular security requirements that differ from other customers. A security protocol transition may be initiated in connection with provisioning resources for a customer in the execution environment. The security protocol transition may include a transition from a first security protocol that is in contradiction with one or more of the particular security requirements of the customer to a second security protocol that is in accordance with the particular security requirements of the customer. In one example, the security protocol transition may reflect an increase in security. Additionally, or alternatively, a security protocol transition may be initiated in connection with deprovisioning resources for a customer in the execution environment. The security protocol transition may include a transition from a first security protocol that corresponds to one or more security features that are requirements to the particular customer to a second security protocol that does not include the particular security features.

A data security requirement may be applicable to transmission or storage of at least one dataset to or from the execution environment. In one example, one or more particular security requirements may be associated with a dataset that differs from the security requirements associated with other datasets. A security protocol transition may be initiated in connection with transmitting or storing data in the execution environment. The security protocol transition may include a transition from a first security protocol that is in contradiction with one or more of the particular security requirements associated with the dataset to a second security protocol that is in accordance with the particular security requirements associated with the dataset. In one example, the security protocol transition may reflect an increase in security. Additionally, or alternatively, a security protocol transition may be initiated in connection with removing a dataset from the execution environment. The security protocol transition may include a transition from a first security protocol that corresponds to one or more security features that are requirements to the particular dataset to a second security protocol that does not include the particular security features.

A workload security requirement may be applicable to working at least one workload in the first execution environment. In one example, one or more particular security requirements may be associated with a workload that differs from the security requirements associated with other workloads. A security protocol transition may be initiated in connection with initializing execution of a workload in the execution environment. The security protocol transition may include a transition from a first security protocol that is in contradiction with one or more of the particular security requirements associated with the workload to a second security protocol that is in accordance with the particular security requirements associated with the workload. In one example, the security protocol transition may reflect an increase in security. Additionally, or alternatively, a security protocol transition may be initiated in connection with concluding or terminating execution of a workload in the execution environment. The security protocol transition may include a transition from a first security protocol that corresponds to one or more security features that are requirements to the particular workload to a second security protocol that does not include the particular security features.

In one example, the set of one or more transition criteria may include a security vulnerability parameter. The security vulnerability parameter may indicate a level of security vulnerability. Additionally, or alternatively, the security vulnerability parameter may indicate a security vulnerability associated with a particular security protocol. In one example, a security protocol transition may be initiated in response to the security vulnerability parameter meeting a parameter value or range. In one example, a security protocol transition may be initiated in response to the security vulnerability parameter meeting an upper security vulnerability threshold. A security protocol transition initiated in response to meeting an upper security vulnerability threshold may reflect an increase in security. Additionally, or alternatively, a security protocol transition may be initiated in response to the security vulnerability parameter meeting a lower security vulnerability threshold. A security protocol transition initiated in response to meeting a lower security vulnerability threshold may reflect a decrease in security. Additionally, or alternatively, a security protocol transition may be initiated in response to a security vulnerability associated with a particular security protocol. A security protocol transition initiated in response to a security vulnerability associated with a particular security protocol may reflect a transition from a first security protocol that is impacted by the security vulnerability to a second security protocol that is unaffected by the security vulnerability. Additionally, or alternatively, a security protocol transition initiated in response to a security vulnerability associated with a particular security protocol may reflect a transition from a first security protocol that represents a relatively higher risk associated the security vulnerability to a second security protocol that represents a relatively lower risk associated with the security vulnerability.

C. Example Security Protocol Selections

In one example, a particular security protocol may be selected from a set of security protocols, for example, prior to initiating a security protocol transition and/or prior to executing the selected security protocol. The particular security protocol may be selected based on a set of one or more parameters associated with the virtual cloud network. The set of one or more parameters associated with the virtual cloud network utilized for selection of the security protocol may be the same as, or different from, the set of one or more parameters associated with the virtual cloud network utilized for determining the trigger condition for initiating a security protocol transition. In one example, a particular security protocol may be independently executable separate from one or more other security protocols. Additionally, or alternatively, a particular security protocol may be distinct from, rather than a variant of, the one or more other security protocols. Additionally, or alternatively, a particular security protocol may represent a modification of another security protocol.

In one example, the operations 700 may include determining a trigger condition at least by applying a machine learning model. Additionally, or alternatively, the operations 700 may include determining a set of one or more transition criteria for triggering a security protocol transition at least by applying a machine learning model. The trigger condition and/or the one or more transition criteria may be determined by applying the machine learning model to a dataset that includes a plurality of security protocol data elements. A security protocol data element, of the plurality of security protocol data elements, may correspond to a set of one or more parameters associated with the virtual cloud network. Additionally, or alternatively, a security protocol data element, of the plurality of security protocol data elements, may correspond to at least one security protocol of a set of security protocols. The machine learning model may generate at least one output, and the at least one output may include one or more trigger conditions and/or one or more transition criteria. Additionally, or alternatively, the at least one output of the machine learning model may include a set of trigger conditions, and the system may select a subset of one or more trigger conditions from the set of trigger conditions output by the machine learning model. Additionally, or alternatively, the at least one output of the machine learning model may include a set of transition criteria, and the system may select a subset of one or more transition criteria from the set of transition criteria output by the machine learning model.

Additionally, or alternatively, the operations 700 may include selecting a security protocol, from a set of security protocols, by applying a machine learning model. The machine learning model may generate at least one output, and the at least one output may include the selected security protocol. The security protocol for a security protocol transition may be determined by applying the machine learning model to a dataset that includes a plurality of security protocol data elements. Additionally, or alternatively, the machine learning model may output a set of candidate security protocols, and a security protocol may be selected from the set of candidate security protocols. Upon having selected the security protocol, the operations 700 may include executing the security protocol transition and/or initiating execution of the selected security protocol.

In one example, the operations 700 may further include receiving feedback corresponding to executing one or more security protocols and updating the machine learning model based at least in part on the feedback. The feedback may include a set of feedback data elements. The set of feedback data elements may include previous outputs of the machine learning model. Additionally, or alternatively, the set of feedback data elements may correspond to one or more parameters associated with the virtual cloud network.

D. Example Parameters

In one example, the operations 700 may include monitoring one or more parameters associated with the virtual cloud network. The parameters may be monitored through various monitoring tools, APIs, or cloud-native services. Operations 700 may be executed based on one or more parameters via automation scripts, orchestration tools, or policies. The one or more parameters associated with the virtual cloud network may be monitored in connection with selecting a security protocol, determining a trigger condition for initiating a security protocol transition, and/or determining a set of one or more transition criteria for triggering a security protocol transition. The one or more parameters associated with the virtual cloud network may include at least one of: resource utilization parameters, network parameters, operations parameters, security parameters, or predictive analysis parameters.

Resource utilization parameters may include parameters associated with monitoring utilization of network resources, such as VMs, OSs, databases, network interfaces, nodes, hosts, agents, services, components, endpoints, or other elements. Additionally, or alternatively, resource utilization parameters may include parameters associated with and usage and allocation of resources, scale-up or scale-down of resources, or load balancing. Additionally, or alternatively, resource utilization parameters may include at least one of: performance parameters, storage usage parameters, or system health parameters. Performance parameters may include parameters associated with system performance, such as response times, error rates, or transaction rates. Additionally, or alternatively, performance parameters may include parameters associated with responses to performance parameters, such as auto-scaling or resource allocation adjustments. Storage usage parameters may include parameters associated with monitoring and/or managing storage capacities, such as parameters associated with automatically expanding storage, archiving data, or triggering alerts when thresholds are reached. System health parameters may include parameters associated with monitoring and/or managing the health of various services or microservices within the network. Additionally, or alternatively, system health parameters may include parameters associated with rerouting network traffic or initiating failover procedures, for example, when a particular service becomes unavailable.

Network parameters may include at least one of: network traffic parameters, latency parameters, or geolocation parameters. Network traffic parameters may include parameters associated with incoming network traffic, outgoing network traffic, adjustments to bandwidth, network traffic routing, or network traffic rerouting. Additionally, or alternatively, network traffic parameters may include parameters associated with network security elements such as firewalls. Latency parameters may include parameters associated with network latency, performance, or scalability. Geolocation parameters may include parameters associated with monitoring and/or managing network traffic patterns based on geographical regions. Additionally, or alternatively, geolocation parameters may include parameters associated with managing content delivery based on geographic regions or responding to fluctuations in resource utilization associated with particular geographical regions.

Operations parameters may include at least one of: scaling parameters, change management parameters, disaster recovery parameters, remediation parameters, cost parameters, energy efficiency parameters, or maintenance parameters. Scaling parameters may include parameters associated with scaling operations, or adding or removing resources, such as in response to actual or predicted fluctuations in resource utilization. Change management parameters may include parameters associated with monitoring and/or managing changes in configurations, code deployments, or system updates. Disaster recovery parameters may include parameters associated with monitoring and/or managing backup status, data integrity, or disaster recovery processes. Additionally, or alternatively, disaster recovery parameters may include parameters associated with initiating backup or disaster recovery processes. Remediation parameters may include parameters associated with identification of issues and automatically applying remediation actions. Additionally, or alternatively, remediation parameters may include parameters associated with restarting services, applying patches, or reconfiguring systems.

Cost parameters may include parameters associated with monitoring and/or managing cost-related metrics such as instance usage, data transfer costs, or storage costs. Additionally, or alternatively, cost parameters may include parameters associated with implementing cost-management measures, such as scheduling or implementing system modifications in accordance with resource utilization or cost. Energy efficiency parameters may include parameters associated with monitoring and/or managing energy usage, efficiency, or cost. Additionally, or alternatively, energy efficiency parameters may include parameters associated with implementing energy-management measures, such as scheduling or implementing system modifications in accordance with energy utilization, efficiency, or cost. Maintenance parameters may include parameters associated with monitoring and/or managing system uptime, usage patterns, or system performance. Additionally, or alternatively, maintenance parameters may include parameters associated with scheduling or performance of maintenance activities.

Security parameters may include at least one of: security event parameters, compliance parameters, or user access parameters. Security event parameters may include parameters associated with monitoring or detection of suspicious activities, intrusion attempts, or anomalies in access patterns. Additionally, or alternatively, security event parameters may include parameters associated with and responding to security events, such as parameters associated with blocking network addresses, quarantining systems, or modifying security protocols. Compliance parameters may include parameters associated with monitoring and/or managing system configurations and utilization against compliance standards, regulatory changes, or triggering alerts or remediation actions to avoid violations and ensure ongoing compliance. User access parameters may include parameters associated with monitoring and/or managing user activities, access patterns, or permissions. Additionally, or alternatively, user access parameters may include parameters associated with access controls, privileges, permissions, or security measures.

Predictive analysis parameters may include parameters associated with machine learning or AI algorithms. Additionally, or alternatively, predictive analysis parameters may include parameters associated with analysis of historical data, prediction of future trends, or proactive adjustments to manage security, performance, cost, or resource utilization.

E. Example Security Protocols

The security protocols executed in an execution environment may include at least one of: IAM system security protocols, network security group protocols, transport layer security (TLS) protocols, mutual TLS (mTLS) protocols, service account-based security protocols, or quorum-based access security protocols.

An IAM system may include a set of security protocols configured to ensure that the right network entities have appropriate access to the right resources at the right time. Security protocols associated with the IAM system may utilize at least one of: principals, identities, access policies, credentials, tokens, digital certificates, passwords, or biometrics. The IAM security protocols may include role-based access control (RBAC) mechanisms. The RBAC may include permissions assigned based on predefined roles. The IAM system may provide for centralized management of identities and access rights. The IAM system may grant, modify, or revoke access rights as needed.

A network security group protocol may utilize stateful packet inspection to control inbound and outbound traffic based on a set of rules. The set of rules may include rules defined for particular network addresses, ports, or communication protocols. Additionally, or alternatively, a network security group protocol may utilize access control lists to filter traffic at the subnet level.

A TLS protocol or an mTLS protocol may utilize cryptography to secure communications between network entities. A TLS protocol or an mTLS protocol may utilize an encrypted connection between the network entities. A TLS protocol may include an authorization process that includes authenticating a server to a client to authorize the client to access the server. An mTLS protocol may include an authorization process that includes authenticating both the server to the client and the client to the server to authorize the client to access the server. A TLS security protocol or an mTLS security protocol may include a TLS handshake between network entities. To perform a TLS handshake, the network entities may exchange cryptographic keys, authenticate one another using digital certificates issued by trusted certificate authorities (CAs), and negotiate encryption algorithms and session keys to be used for securing communications.

A service account-based security protocol may include one or more service accounts that are created to represent machine-to-machine communications. A service account-based security protocol may utilize credentials such as API keys, OAuth tokens, or other cryptographic tokens. In one example, a service account-based security protocol may be utilized in connection with container orchestrations platforms such as Kubernetes.

A quorum-based access security protocol may include a mechanism utilized in a distributed system to make decisions or grant permissions based on an agreement reached among a certain subset or majority of network entities or nodes within the system. A quorum-based access security protocol may utilize a voting or a consensus process whereby network entities or nodes communicate and coordinate to reach an agreement before allowing access to resources, performing operations, or making decisions. A predefined quorum representing a minimum threshold of agreement among the participating network entities or nodes may be required to authorize actions, ensuring that the system operates securely and reliably even in the presence of potential failures or malicious network entities.

A security protocol may include a multifactor authentication (MFA) security protocol. The MFA security protocol may include at least two security protocols. A security protocol transition may include changing, adding, or removing one or more security protocols utilized in an MFA security protocol.

7. Miscellaneous; Extensions

Embodiments are directed to a system with one or more devices that include a hardware processor and that are configured to perform any of the operations described herein and/or recited in any of the claims below. Embodiments are directed to a system including means to perform any of the operations described herein and/or recited in any of the claims below. In an embodiment, a non-transitory computer readable storage medium comprises instructions that when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. Accordingly, the specification and drawings are to be regarded in an illustrative rather than a restrictive sense. The sole and exclusive indicator of the scope of patent protection, and what is intended by the applicants to be the scope of patent protection, is the literal and equivalent scope of the set of claims that issue from this application in the specific form that such claims issue, including any subsequent correction.

References, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media storing instructions that, when executed by one or more hardware processors, cause performance of operations comprising:

executing a first security protocol in a first execution environment of a virtual cloud network, wherein the first security protocol comprises utilizing a first authorization process to authorize a first set of network entities to access a first set of target resources corresponding to the first execution environment, wherein executing the first security protocol comprises executing the first authorization process with respect to at least one network entity, of the first set of network entities;

detecting a change in a set of one or more security parameters associated with the virtual cloud network, wherein the set of one or more security parameters comprises at least one of:

(a) an event parameter associated with monitoring, detecting, or responding to a suspicious activity, an intrusion attempt, one or more anomalies an access pattern, or (b) a compliance parameter associated with monitoring or managing a system configuration or utilization based on a regulatory or compliance standard;

based on detecting the change in the set of one or more security parameters: determining a first trigger condition, wherein the first trigger condition indicates that the change in the set of one or more security parameters meets a first set of one or more transition criteria for executing a security protocol transition;

responsive to determining the first trigger condition, executing the security protocol transition while executing the first execution environment, wherein executing the security protocol transition comprises:

terminating execution of the first security protocol with respect to the first execution environment, and initiating execution of a second security protocol in the first execution environment, wherein the second security protocol comprises utilizing a second authorization process to authorize the first set of network entities to access the first set of target resources, wherein execution of the second security protocol comprises executing the second authorization process with respect to at least one network entity, of the first set of network entities.

2. The one or more non-transitory computer-readable media of claim 1, wherein the operations further comprise:

subsequent to initiating execution of the second security protocol, determining that the first set of one or more transition criteria is unmet;

responsive to determining that the first set of one or more transition criteria is unmet:

terminating execution of the second security protocol with respect to the first execution environment, and re-initiating execution of the first security protocol in the first execution environment, wherein execution of the first security protocol comprises:

subsequent to terminating execution of the second security protocol, executing the first authorization process with respect to at least one network entity, of the first set of network entities.

3. The one or more non-transitory computer-readable media of claim 2, wherein determining that the first set of one or more transition criteria is unmet comprises:

determining a second trigger condition, wherein the second trigger condition indicates that the set of one or more security parameters meets a second set of one or more transition criteria, wherein the second set of one or more transition criteria comprises a second change in at least a second security parameter of the set of one or more security parameters associated with the virtual cloud network, wherein the second set of one or more transition criteria differs from the first set of one or more transition criteria.

4. The one or more non-transitory computer-readable media of claim 1, wherein the operations further comprise:

subsequent to initiating execution of the second security protocol:

determining a second trigger condition, wherein the second trigger condition indicates that the set of one or more security parameters meets a second set of one or more transition criteria, wherein the second set of one or more transition criteria comprises a second change in at least a second security parameter of the set of one or more security parameters associated with the virtual cloud network;

responsive to determining the second trigger condition:

terminating execution of the second security protocol with respect to the first execution environment, and initiating execution of a third security protocol in the first execution environment, wherein the third security protocol comprises utilizing a third authorization process to authorize the first set of network entities to access the first set of target resources, wherein execution of the third security protocol comprises executing the third authorization process with respect to at least one network entity, of the first set of network entities, wherein the second set of one or more transition criteria differs from the first set of one or more transition criteria.

5. The one or more non-transitory computer-readable media of claim 1, wherein the operations further comprise:

prior to initiating execution of the second security protocol:

selecting the second security protocol, from a set of security protocols, based on the set of one or more security parameters associated with the virtual cloud network.

6. The one or more non-transitory computer-readable media of claim 1, wherein the operations further comprise:

while executing the first security protocol and prior to determining the first trigger condition:

maintaining, in the first execution environment, a state or a configuration corresponding to the second security protocol, wherein execution of the second security protocol is performed at least in part based on the state or the configuration corresponding to the second security protocol.

7. The one or more non-transitory computer-readable media of claim 1, wherein the second security protocol is independently executable separate from the first security protocol, and wherein the second security protocol is distinct from, rather than a variant of, the first security protocol.

8. The one or more non-transitory computer-readable media of claim 1, wherein the operations further comprise:

prior to determining the first trigger condition:

executing the first security protocol in a second execution environment of the virtual cloud network, wherein the first security protocol further comprises utilizing the first authorization process to authorize a second set of network entities to access a second set of target resources corresponding to the second execution environment, wherein executing the first security protocol further comprises executing the first authorization process with respect to at least one network entity, of the second set of network entities;

subsequent to determining the first trigger condition:

further executing the first security protocol in the second execution environment, wherein further executing the first security protocol comprises executing the first authorization process with respect to at least one network entity, of the second set of network entities.

9. The one or more non-transitory computer-readable media of claim 1, wherein the first set of one or more transition criteria comprises a security requirement, wherein the security requirement comprises at least one of:

a customer security requirement, wherein the customer security requirement is applicable to access of at least one customer to the first execution environment;

a data security requirement, wherein the data security requirement is applicable to transmission of at least one dataset to or from the first execution environment; or a workload security requirement, wherein the workload security requirement is applicable to working at least one workload in the first execution environment.

10. The one or more non-transitory computer-readable media of claim 1, wherein the first set of one or more transition criteria comprises a number of network entities utilizing the first security protocol meeting a threshold number.

11. The one or more non-transitory computer-readable media of claim 1, wherein the first set of one or more transition criteria comprises a security vulnerability parameter meeting a parameter value or range, wherein the security vulnerability parameter indicates a level of security vulnerability.

12. The one or more non-transitory computer-readable media of claim 1, wherein the first set of one or more transition criteria comprises an occurrence of an outage associated with the first execution environment.

13. The one or more non-transitory computer-readable media of claim 1, wherein the operations further comprise:

prior to initiating execution of the second security protocol:

selecting the second security protocol, from a set of security protocols, at least by applying a machine learning model to a dataset comprising a plurality of security protocol data elements, wherein each security protocol data element, of the plurality of security protocol data elements, corresponds to the set of one or more security parameters associated with the virtual cloud network, wherein the set of security protocols comprises the first security protocol and the second security protocol;

wherein the machine learning model generates at least one output, wherein the at least one output comprises the second security protocol.

14. The one or more non-transitory computer-readable media of claim 1, wherein the operations further comprise:

determining at least one of: the first trigger condition, or the first set of one or more transition criteria, at least by applying a machine learning model to a dataset comprising a plurality of security protocol data elements, wherein each security protocol data element, of the plurality of security protocol data elements, corresponds to at least one of: the set of one or more security parameters associated with the virtual cloud network, or at least one security protocol, of a set of security protocols, wherein the set of security protocols comprises the first security protocol and the second security protocol;

wherein the machine learning model generates at least one output, wherein:

the at least one output comprises the first trigger condition, or wherein the first trigger condition is based on the at least one output; or the at least one output comprises the first set of one or more transition criteria, or wherein the first set of one or more transition criteria is based on the at least one output.

15. The one or more non-transitory computer-readable media of claim 14, wherein the operations further comprise:

receiving feedback corresponding to executing at least one of the first security protocol, or the second security protocol; and updating the machine learning model based at least in part on the feedback;

wherein the feedback comprises a set of feedback data elements, wherein each feedback data element, of the set of feedback data elements, corresponds to the set of one or more security parameters associated with the virtual cloud network.

16. A method, comprising:

executing a first security protocol in a first execution environment of a virtual cloud network, wherein the first security protocol comprises utilizing a first authorization process to authorize a first set of network entities to access a first set of target resources corresponding to the first execution environment, wherein executing the first security protocol comprises executing the first authorization process with respect to at least one network entity, of the first set of network entities;

detecting a change in a set of one or more security parameters associated with the virtual cloud network, wherein the set of one or more security parameters comprises at least one of:

(a) an event parameter associated with monitoring, detecting, or responding to a suspicious activity, an intrusion attempt, one or more anomalies an access pattern, or (b) a compliance parameter associated with monitoring or managing a system configuration or utilization based on a regulatory or compliance standard;

based on detecting the change in the set of one or more security parameters: determining a first trigger condition, wherein the first trigger condition indicates that the change in the set of one or more security parameters meets a first set of one or more transition criteria for executing a security protocol transition;

responsive to determining the first trigger condition, executing the security protocol transition while executing the first execution environment, wherein executing the security protocol transition comprises:

terminating execution of the first security protocol with respect to the first execution environment, and initiating execution of a second security protocol in the first execution environment, wherein the second security protocol comprises utilizing a second authorization process to authorize the first set of network entities to access the first set of target resources, wherein execution of the second security protocol comprises executing the second authorization process with respect to at least one network entity, of the first set of network entities;

wherein the method is performed by at least one device including a hardware processor.

17. The method of claim 16, further comprising:

prior to determining the first trigger condition:

executing the first security protocol in a second execution environment of the virtual cloud network, wherein the first security protocol further comprises utilizing the first authorization process to authorize a second set of network entities to access a second set of target resources corresponding to the second execution environment, wherein executing the first security protocol further comprises executing the first authorization process with respect to at least one network entity, of the second set of network entities;

subsequent to determining the first trigger condition:

further executing the first security protocol in the second execution environment, wherein further executing the first security protocol comprises executing the first authorization process with respect to at least one network entity, of the second set of network entities;

subsequent to initiating execution of the second security protocol:

determining a second trigger condition, wherein the second trigger condition indicates that the set of one or more security parameters meets a second set of one or more transition criteria, wherein the second set of one or more transition criteria comprises a second change in at least a second security parameter of the set of one or more security parameters associated with the virtual cloud network;

responsive to determining the second trigger condition:

terminating execution of the second security protocol with respect to the first execution environment, and initiating execution of a third security protocol in the first execution environment, wherein the third security protocol comprises utilizing a third authorization process to authorize the first set of network entities to access the first set of target resources, wherein execution of the third security protocol comprises executing the third authorization process with respect to at least one network entity, of the first set of network entities, wherein the second set of one or more transition criteria differs from the first set of one or more transition criteria.

18. The method of claim 17, wherein the first set of one or more transition criteria comprises at least one of:

a number of network entities utilizing the first security protocol meeting a threshold number;

a security vulnerability parameter meeting a parameter value or range, wherein the security vulnerability parameter indicates a level of security vulnerability; or an occurrence of an outage associated with the first execution environment; and wherein the second set of one or more transition criteria comprises a security requirement, wherein the security requirement comprises at least one of:

a customer security requirement, wherein the customer security requirement is applicable to access of at least one customer to the first execution environment;

a data security requirement, wherein the data security requirement is applicable to transmission of at least one dataset to or from the first execution environment; or a workload security requirement, wherein the workload security requirement is applicable to working at least one workload in the first execution environment.

19. The method of claim 17, further comprising:

prior to initiating execution of the second security protocol:

selecting the second security protocol, from a set of security protocols, based on the set of one or more security parameters associated with the virtual cloud network; or prior to initiating execution of the third security protocol:

selecting the third security protocol, from the set of security protocols, based on the set of one or more security parameters associated with the virtual cloud network.

20. The one or more non-transitory computer-readable media of claim 1, wherein the first security protocol and the second security protocol respectively comprise at least one of: an identity access management system security protocol, a network security group protocol, a transport layer security (TLS) protocol, a mutual TLS security protocol, a service account-based security protocol, a quorum-based access security protocols, or a multifactor authentication security protocol.

21. A system, comprising:

at least one hardware processor;

wherein the system is configured to execute operations, using the at least one hardware processor, the operations comprising:

executing a first security protocol in a first execution environment of a virtual cloud network, wherein the first security protocol comprises utilizing a first authorization process to authorize a first set of network entities to access a first set of target resources corresponding to the first execution environment, wherein executing the first security protocol comprises executing the first authorization process with respect to at least one network entity, of the first set of network entities;

detecting a change in a set of one or more security parameters associated with the virtual cloud network, wherein the set of one or more security parameters comprises at least one of:

(a) an event parameter associated with monitoring, detecting, or responding to a suspicious activity, an intrusion attempt, one or more anomalies an access pattern, or (b) a compliance parameter associated with monitoring or managing a system configuration or utilization based on a regulatory or compliance standard;

based on detecting the change in the set of one or more security parameters: determining a first trigger condition, wherein the first trigger condition indicates that the change in the set of one or more security parameters meets a first set of one or more transition criteria for executing a security protocol transition;

responsive to determining the first trigger condition, executing the security protocol transition while executing the first execution environment, wherein executing the security protocol transition comprises:

terminating execution of the first security protocol with respect to the first execution environment, and initiating execution of a second security protocol in the first execution environment, wherein the second security protocol comprises utilizing a second authorization process to authorize the first set of network entities to access the first set of target resources, wherein execution of the second security protocol comprises executing the second authorization process with respect to at least one network entity, of the first set of network entities.

*    *    *    *    *